United States Patent
Barcik et al.

(10) Patent No.: US 9,468,194 B2
(45) Date of Patent: Oct. 18, 2016

(54) SYSTEMS AND METHODS FOR STIMULATING ANIMAL BEHAVIOR

(76) Inventors: Robert Barcik, Stuart, FL (US); John Barcik, Stuart, FL (US)

(*) Notice: Subject to any disclaimer, the term of this patent is extended or adjusted under 35 U.S.C. 154(b) by 845 days.

(21) Appl. No.: 13/369,967

(22) Filed: Feb. 9, 2012

(65) Prior Publication Data
US 2013/0206081 A1   Aug. 15, 2013

(51) Int. Cl.
*A01K 15/02* (2006.01)

(52) U.S. Cl.
CPC .................................... *A01K 15/02* (2013.01)

(58) Field of Classification Search
CPC ................................................ A01K 15/02
USPC ....... 119/14.02, 14.27, 14.28, 601, 712, 719, 119/720
See application file for complete search history.

(56) References Cited

U.S. PATENT DOCUMENTS

| | | | |
|---|---|---|---|
| 3,916,911 A * | 11/1975 | Sauder et al. | 607/104 |
| 5,205,238 A | 4/1993 | Boice | |
| 5,901,660 A | 5/1999 | Stein | |
| 6,168,573 B1 | 1/2001 | Fielding et al. | |
| 6,334,409 B1 | 1/2002 | Stein et al. | |
| 7,914,468 B2 | 3/2011 | Shalon et al. | |
| 2006/0247561 A1 * | 11/2006 | Chiu | 601/47 |
| 2006/0255955 A1 * | 11/2006 | O'Connor et al. | 340/573.1 |
| 2008/0046027 A1 * | 2/2008 | Cook et al. | 607/50 |
| 2010/0206242 A1 * | 8/2010 | Jones | 119/601 |

OTHER PUBLICATIONS

"Text-book of pharmacology and therapeutics", W. Hale-White, 1901, p. 904.*

* cited by examiner

*Primary Examiner* — Thien Thanh Pham
(74) *Attorney, Agent, or Firm* — Kilpatrick Townsend & Stockton LLP

(57) ABSTRACT

According to the invention, a system for stimulating eating by an animal is disclosed. The system may include a primary unit and a secondary unit. The primary unit may be configured to be at least partially supported by a rear portion of the animal's spine. The secondary unit may be coupled with the primary unit and configured to be coupled with a top dorsal portion of the animal's tail. The primary unit may include a first power supply, a processor powered by the first power supply, a second power supply, and a speaker powered by the second power supply and controlled by the processor. The secondary unit may include a vibration generation device powered by the second power supply and controlled by the processor, and a pressure generation device powered by the second power supply and controlled by the processor.

20 Claims, 4 Drawing Sheets

SYSTEMS AND METHODS FOR STIMULATING ANIMAL BEHAVIOR

BACKGROUND OF THE INVENTION

This invention relates generally to stimulation of animal behavior. More specifically the invention relates to systems and methods for causing animals, including cattle and horses, to ingest more food. Other behavioral modifications may also be possible within the scope of the invention.

In 2011 there were approximately 100 million cattle and calves in the United States. Each of these cattle, referred to herein individually as cows, whether male or female, is cared for so as to either produce milk or be slaughtered for beef and other meat products. Both the amount of milk and the amount of beef and other meat products produced by a cow is greatly dependent on the amount of feed intake by the animal. Additionally, animals which are sick, pregnant, or recovering from being sick or pregnant can benefit from increased feed intake.

The equine industry, while not as large in terms of number of animals, is responsible for a large amount of market capital, and could also benefit from novel behavioral modification systems. While revenue in the equine production market in the U.S. is a modest two billion dollars per year industry, many downstream industries are affected by the equine production market, including the 400-plus billion dollar worldwide horse betting industry.

Embodiments of the present invention provide systems and methods for stimulating animal eating behavior, thereby increasing the productivity and quality of products delivered by the relevant industry.

BRIEF DESCRIPTION OF THE INVENTION

In one embodiment, a system for stimulating eating by an animal is provided. The system may include a primary unit and a secondary unit. The primary unit may be configured to be at least partially supported by a rear portion of the animal's spine. The secondary unit may be coupled with the primary unit and configured to be coupled with a top dorsal portion of the animal's tail. The primary unit may include a first power supply, a processor powered by the first power supply, a second power supply, and a speaker powered by the second power supply and controlled by the processor. The secondary unit may include a vibration generation device powered by the second power supply and controlled by the processor, and a pressure generation device powered by the second power supply and controlled by the processor.

In another embodiment, a method for stimulating behavior of an animal is provided. The method may include activating, intermittently or continuously, a pressure generation device against the animal for at least first increment of time. The method may also include activating, intermittently or continuously, a vibration generation device against the animal for at least a second increment of time, where the first increment of time and the second increment of time are at least partially concurrent or not concurrent. The method may further include deactivating, continuously, both the pressure generation device and the vibration device for at least a third increment of time, wherein the third increment of time is not concurrent with the first increment of time and the second increment of time. The method may further include activating, intermittently or continuously, a sound generation device against the animal for at least third increment of time, where the first increment of time, the second increment of time, and the third increment of time are at least partially concurrent or not concurrent.

In another embodiment, a system for stimulating behavior of an animal is provided. The system may include a first means, a second means, a third means, and a fourth means. The first means may be for generating a pressure against a first portion of the animal. The first means may include a pressure generation device. The second means may be for generating a vibration against a portion of the animal. The second means may include a vibration generation device. The third means may be for controlling the first means and the second means. The third means may include a processor. The fourth means may be for supplying power to the first means, second means, and third means. The fourth means may include a power supply. Some embodiments may also include a fifth means for producing a sound. The fifth means may include a speaker or a mechanical device which produces sound due to mechanical interaction of parts thereof.

BRIEF DESCRIPTION OF THE DRAWINGS

The present invention is described in conjunction with the appended figures.

Figure 1:
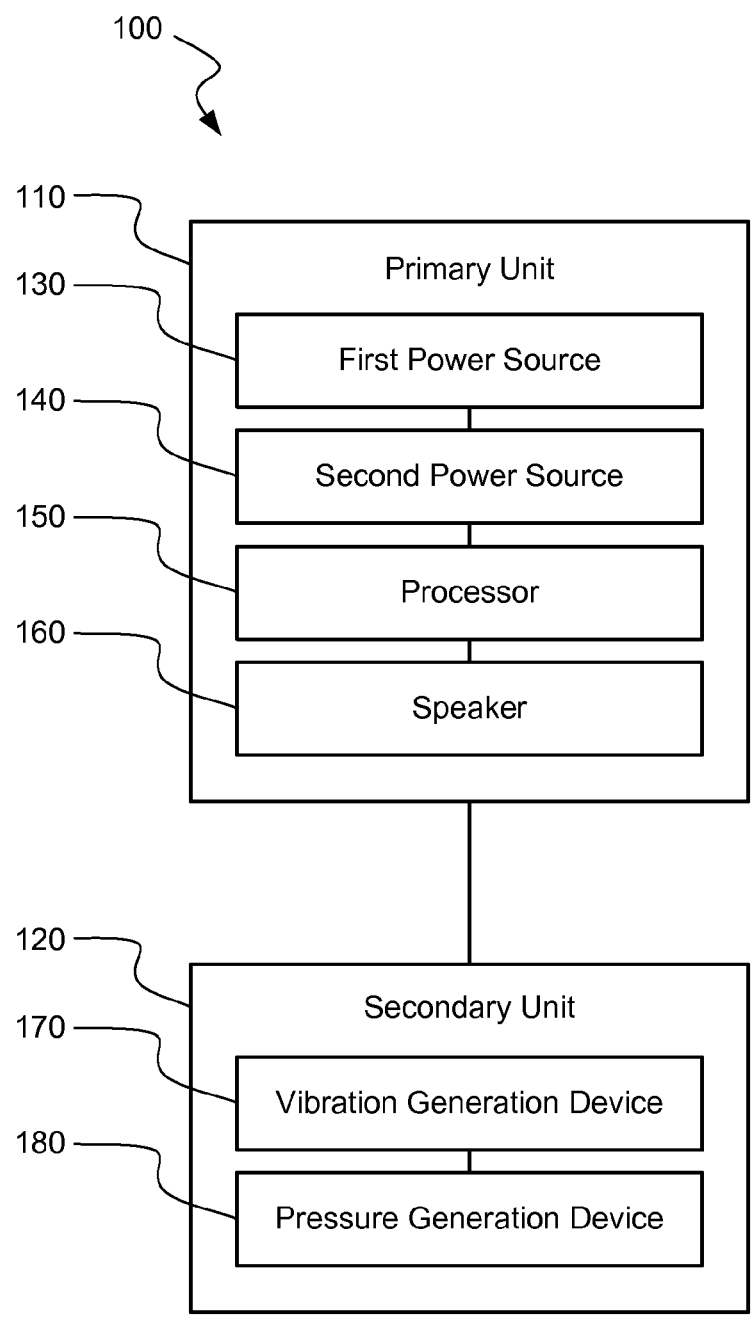
FIG. 1 is a block diagram of one system embodiment of the invention for stimulating animal behavior.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In one embodiment of the invention, a system for stimulating eating by an animal is provided. The system may include a primary unit and a secondary unit. The primary unit may be configured to be at least partially supported by a rear portion of the animal's spine. The secondary unit may be coupled with the primary unit and configured to be coupled with a top dorsal portion of the animal's tail. The primary unit may include a first power supply, a processor powered by the first power supply, a second power supply, and a speaker powered by the second power supply and controlled by the processor. The secondary unit may include a vibration generation device powered by the second power supply and controlled by the processor, and a pressure generation device powered by the second power supply and controlled by the processor.

In some embodiments, the animal may be a cow, horse, or dog. In other embodiments, the animal may be another type of mammal. In yet other embodiments, the animal may be a member of the subphylum vertebrate, for example, fish, amphibians, reptiles, and birds. Depending on the exact type of animal, the primary unit and secondary unit may be located in different locations on the animal. In some embodiments, the primary and secondary unit may be combined in one location (for example, animals without tails).

The type of behavior or behaviors produced by the systems and methods of the invention can be any number of possible behaviors. In some embodiments, the behavior may be an observable behavior such as eating, following other animals, mating cycles, reception to mounting/riding, etc. In other embodiments, the behavior may be internal biological behaviors, for example, milk or muscle production, coming into heat (mating), recovery from illness, etc.

The power supply may, merely by way of example, include one or more of a battery or set of batteries, a solar power source, a kinetic energy self-winding power generation device, etc. The power source, especially when it includes batteries or other charge storing device, may be disposable or rechargeable.

The speaker, vibration generation device, and pressure generation device may be referred to herein, either individually or collectively as stimulus or stimuli devices. The effects they produce (sound, vibration, and pressure) may be referred to as stimulus or stimuli. Any one stimuli device may consist of multiple actual devices, either acting sequentially or concurrently to achieve the desired effect.

The speaker may be any device configured to produce a sound when activated. Examples of possible speakers include any range of driver (dynamic loudspeaker), horn loudspeaker, piezoelectric speaker, etc. Though in most embodiments the speaker is located in the primary unit, in some embodiments it may be located in the secondary unit or on the coupling mechanism between the primary unit and the second unit. In other embodiments, sound for systems and methods of the invention may be produced by other devices of the invention, including for example, a pressure generation device or a vibration generation device.

The vibration generation device can include any device configured to produce a vibration against a portion of an animal when activated. Examples of possible vibration devices include motors with an off center weight on the shaft, a buzzer armature, etc. Though in most embodiments, the vibration generation device is located in the secondary unit, in other embodiments it may be located in the primary unit or elsewhere on the system or animal.

The pressure generation device can include any device configured to produce pressure across a fixed or variable sized area of an animal when activated. Examples of possible pressure generation devices could include a solenoid or other actuated mechanism, gas or liquid filled bladder, etc. The pressure may be produced in long periods or short periods over large areas or small areas. For example, a large-area uniform pressure may be generated at a multi-second interval, or a small-area rapid-pulse pressure may be generated at a partial-second interval (e.g., a persistent tapping). Though in most embodiments, the pressure generation device is located in the secondary unit, in other embodiments it may be located in the primary unit or elsewhere on the system or animal.

The pressure generation device could generate acute pressure, delivering a pinching to the portion of the animal (for example, its tail). In other embodiments, the pressure generation device could generate more generalized pressure. Examples of this might include a gas or liquid filled expandable bladder against a portion of the animal, including wrapped around a portion of the animal (for example, its tail).

In some embodiments, an individual integrated device may produce multiple types of stimuli, either concurrently or non-concurrently. For example, a buzzer-type device may produce rhythmic pressure on a portion of the animal, and cause a sound to be emitted during the creation of the rhythmic pressure. This would cause pressure, vibration (via the rhythmic pressure), and sound to be generated by a single device. In one embodiment such a device may be produced by two ring gears with teeth on their face being turned against each other with a spring allowing variable distances between the face of the gears. The impact of the gears would produce rhythmic pressure, and hence vibration, along with sound.

The primary unit and secondary unit may be coupled with the animal in any number of manners, including by the use of adhesives and/or straps or other tie-downs (for example, a harness). In yet other embodiments, the primary unit may be integrated with a blanket or other flexible member that may be laid over the back of the animal. The primary unit may then be coupled with the secondary unit via both an electrical connection and/or a mechanical connection. In some embodiments, the electrical connection and the mechanical connection may be integrated, for example, a reinforced electrical cable having multiple conductors. The electrical connection may deliver power, control, and sensor signals between the primary unit and the secondary unit. The mechanical connection may be used to stabilize the coupling of either unit to the animal, or prevent loss of the device (via tethering) should the coupling of one unit to the animal fail.

The processor, which may control and/or process input from any other portion of the system, can be configured in any number of ways to achieve stimulation of the animal resulting in increased eating activity thereof. In one embodiment, the processor may be configured to selectively, in half second increments, activate, keep activated, deactivate, and keep deactivated at least one of the speaker, the vibration generation device, or the pressure generation device.

In these or other embodiments, the processor may be configured to initiate a stimulus interval of 120 of the above described half second increments of selected activation, continued activation, deactivation, and continued deactivation of at least one of the speaker, the vibration generation device, or the pressure generation device. Thus, a stimulus interval may be a 60 second period, with 120 sub-parts during which the same or different stimuli, or the same or different combinations of stimuli may be applied to the animal.

In these or other embodiments, the processor may be configured to initiate a stimulus period of 60 consecutive stimulus intervals described above. Thus, a stimulus period may be a 1 hour period, with 60 sub-part minutes during which the same or different stimulus intervals are applied to the animal.

In these or other embodiments, the processor may be configured to initiate an eight-hour cycle which includes the stimulus period and a rest period of seven hours following the stimulus period, where during the rest period the speaker, the vibration generation device, and the pressure generation device are deactivated. In other embodiments, each cycle of eight hours may consist of varying numbers of stimulus periods and rest periods. Each stimulus period may be the same or different than other stimulus periods in the cycle. A day may consist of three consecutive eight-hour cycles, with each cycle being the same or different than other cycles during the same day.

In yet other embodiments, the processor may be configured to initiate a six-hour cycle which includes the stimulus period and a rest period of five hours following the stimulus period, where during the rest period the speaker, the vibration generation device, and the pressure generation device are deactivated. In other embodiments, each cycle of six hours may consist of varying numbers of stimulus periods and rest periods. Each stimulus period may be the same or different than other stimulus periods in the cycle. A day may consist of four consecutive six-hour cycles, with each cycle being the same or different than other cycles during the same day.

One possible stimuli pattern which may be employed by an embodiment of the invention may be as follows. One minute of auditory stimuli, one minute of vibration stimuli, followed by four rest minutes (no stimuli). This may be followed by three minutes of auditory stimuli, then fourteen minutes of vibration stimuli, and then one rest minute. The previously described 18 minute sequence may occur three times, resulting in a 60 minute stimulation period. This stimulation period may be followed by seven one-hour rest periods. This total eight hour cycle (1+7) may be repeated three times daily. Auditory and vibration stimuli may be pulsed, one half second activated/on, then one half second deactivated/off. This embodiment may not employ pressure generation devices, and as such, they may or may not be present on the system embodiment employed.

Another possible stimuli pattern which may be employed by another embodiment of the invention may be as follows. Two minutes of auditory of stimuli, 13 minutes of vibration, repeated four times for a total of one hour of stimulation. This may be followed by no stimulation for seven or five hours and repeated three or four times for a total of 24 hours.

Another possible stimuli pattern which may be employed by another embodiment of the invention may be as follows. Two minutes of auditory of stimuli, 13 minutes of pressure, repeated four times for a total of one hour of stimulation. This may be followed by no stimulation for seven or five hours and repeated three or four times for a total of 24 hours.

Another possible stimuli pattern which may be employed by another embodiment of the invention may be as follows. Three minutes buzzing (pressure, vibration, and sound) or tapping by the pressure generation device, one minute auditory stimulation, and 11 minutes vibration or pressure, repeated four times for a total of one hour of stimulation. This may be followed by no stimulation for seven or five hours and repeated three or four times for a total of 24 hours.

While repeating 15 minute sub-periods have generally been described, the repeating sub-period may be shorter or longer than 15 minutes. For example, repeated ten or 20 minute sub-periods may also be employed. One 20 minute embodiment may employ three repeated sub-periods of four minutes of buzzing/tapping/poking, two minutes of auditory stimulation, and 14 minutes of vibration or pressure. Typical embodiments will have one hour periods, though other length of periods are possible.

In some embodiments, 24 hour sets of cycles could be repeated for either 21 or 30 days. Depending on the animal, the devices and methods of the invention may only be applied to the animal intermittently, possibly only while the animals are fed. Any devices applied to the animals may then be removed until the next application time. For example, the devices and methods of the invention may be applied to horses during feeding time, but otherwise removed from the animal.

The processor, and/or other devices in communication with the processor, may also provide other features. For example, demographic animal data (age, breed, lactation information, identifier variables) may be stored and made accessible by the processor. Bidirectional or unidirectional ports may be provided that allow Universal Serial Bus, IEEE 1394, radio frequency (WiFi™ and Bluetooth™) may allow other devices, both stationary and handheld, to interact with the processor. Stimuli patterns, as discussed above, may be stored as instructional sets by the processor, and may be updated, changed, revised, and/or deleted by communication with the processor. In some embodiments, peripheral equipment such as activity/inactivity monitors, pedometers, heart rate monitors, blood pressure monitors, temperature monitors, etc. may communicate with the processor via the ports described, and cause actuation of schedules/patterns of stimuli, or individual activation of particular stimuli in response to specific events and/or detected conditions. In these or other embodiments, the processor and any associated memory may also be used to store information received from such peripherals for later retrieval and analysis.

Additional features of some embodiments of the invention include visual indicators, data stores, and location detection systems. Visual indicators may display to nearby operators when at least one of the stimuli devices is active. Merely by way of example, a visual indicator may include an LED, LCD, or lamp which lights up when activated. The same or other visual indicator(s) may also show when voltage of either the first or second power supply drops below a predetermined level.

Data stores in communication with the processor may store data related to when any particular stimulus should be activated, and when it is actually activated (as opposed to failures of stimuli devices). The data store may be accessible either by hard-wire or wireless depending on the particular embodiment. In some embodiments, the processor may be able to change what stimuli patterns are delivered based on information received by the processor by any data acquisition devices discussed herein or otherwise. Each stimuli pattern may include information indicating sequencing, order, duration, timing, and magnitude/amplitude of each stimuli used in the pattern.

In the above or other embodiments, the primary or secondary unit may also include location determining hardware and/or software. Such systems may include, merely by way of example, global positioning satellite (GPS) systems, radio frequency identifier systems, etc. These systems may allow the position of the primary or secondary units, and hence the host animal, to be determined. In some of these embodiments, a data store may be able to store data related to a location of the system over time.

Additional data acquisition devices which may be coupled with the processor include movement or vibration detection devices, light sensors, microphones, temperature sensors, and/or external or internal pressure sensors (e.g., blood or other internal biological pressures). Stimuli patterns may be responsive to these and/or other variables, which may be controlled per stored instructions executable by the processor.

In another embodiment of the invention, a method for stimulating behavior of an animal is provided. The method may include activating, intermittently or continuously, a pressure generation device against at least a portion of the animal for at least first increment of time. The method may also include activating, intermittently or continuously, a vibration generation device against at least a portion of the animal for at least second increment of time, where the first increment of time and the second increment of time are at least partially concurrent or not concurrent. The method may further include deactivating, continuously, both the pressure generation device and the vibration device for at least a third increment of time, wherein the third increment of time is not concurrent with the first increment of time and the second increment of time. The method may further include activating, intermittently or continuously, a sound generation device against the animal for at least third increment of time, where the first increment of time, the second increment of time, and the third increment of time are at least partially concurrent or not concurrent.

In another embodiment of the invention, a system for stimulating behavior of an animal is provided. The system may include a first means, a second means, a third means, and a fourth means. The first means may be for generating a pressure against a first portion of the animal. The first means may include a pressure generation device. The second means may be for generating a vibration against a portion of the animal. The second means may include a vibration generation device. The third means may be for controlling the first means and the second means. The third means may include a processor. The fourth means may be for supplying power to the first means, second means, and third means. The fourth means may include a power supply. Some embodiments may also include a fifth means for producing a sound. The fifth means may include a speaker or a mechanical device which produces sound due to mechanical interaction of parts thereof.

Turning now to FIG. 1, a block diagram of one system 100 embodiment of the invention for stimulating animal behavior is shown. System 100 may include a primary unit 110 coupled with a secondary unit 120. Primary unit 110 may include a first power source 130, a second power source 140, a processor 150, and a speaker 160. System 100 may function as described above.

In other embodiments, any particular portions of system 100 may not be present, may be combined with another portion of system 100, and/or may be located elsewhere on or about system 100. For example, in another embodiment, first power source 130 and second power source 140 may be combined into a single power source. In another embodiment, speaker 160 may be located elsewhere on system 100. In yet other embodiments, pressure generation device 180 may not be present.

Figure 2A:
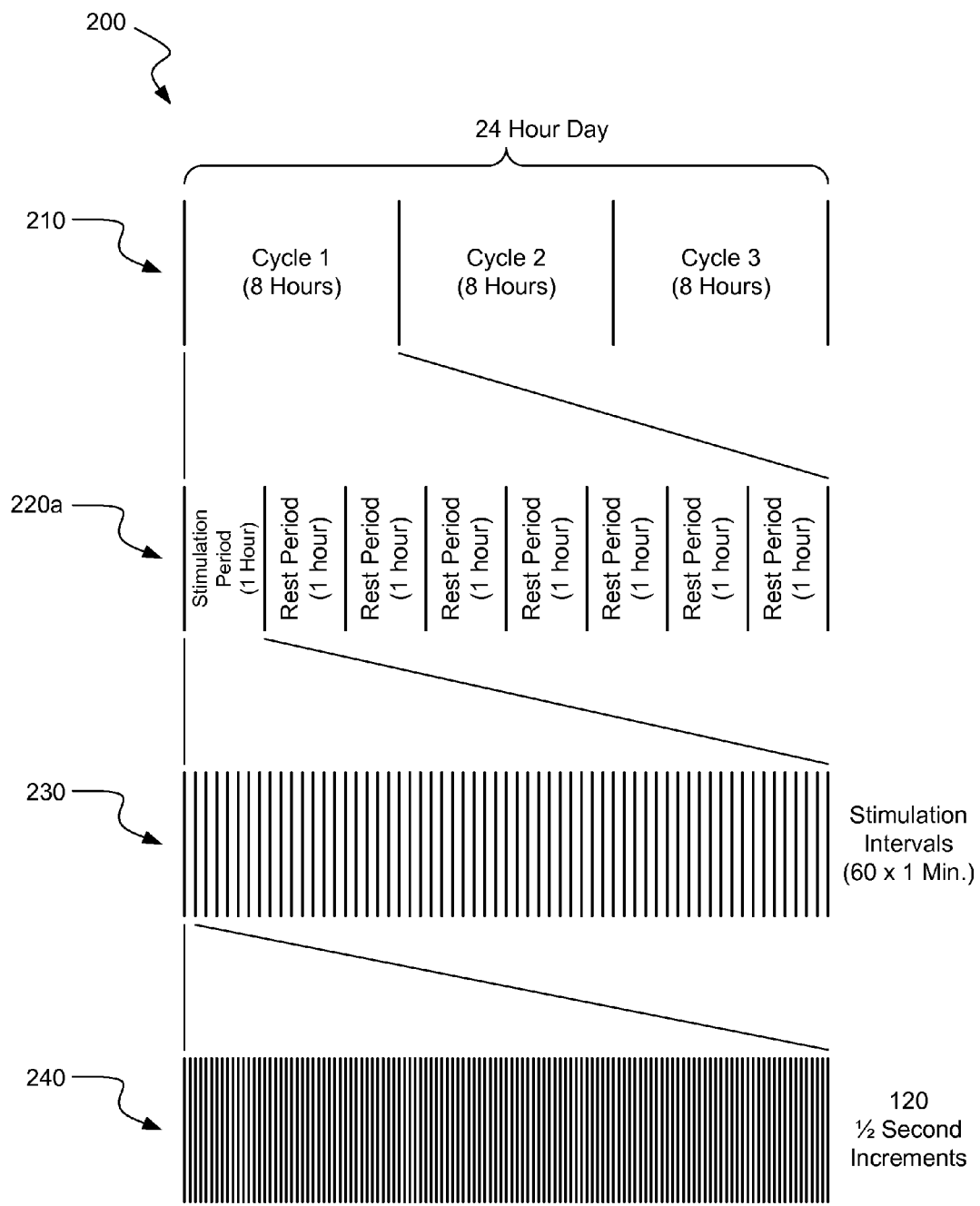
FIG. 2a is a diagram of one possible time increment breakdown by which systems and methods of the invention may stimulate an animal.

FIG. 2a shows the various timing increments 200 described above, and at which the systems of the invention may possibly be configured to operate. A day 210 may include three eight hour cycles 220a. Each eight hour cycle 220a may include eight one-hour periods. In this example, a stimulation period 230 is shown followed by seven one-hour rest periods. Other embodiments may use more stimulation periods.

Each stimulation period includes 60 one-minute stimulation intervals 240. Each one-minute stimulation interval 240 includes 120 one-half second increments. As described above, stimuli devices may be activated, deactivated, kept activated, or kept deactivated at one-half second increments. Different embodiments of the invention may therefore activate/deactivate different stimuli devices in various combinations up to a resolution of one-half second to produce a stimuli schedule for changing different behaviors of animals.

Figure 2B:
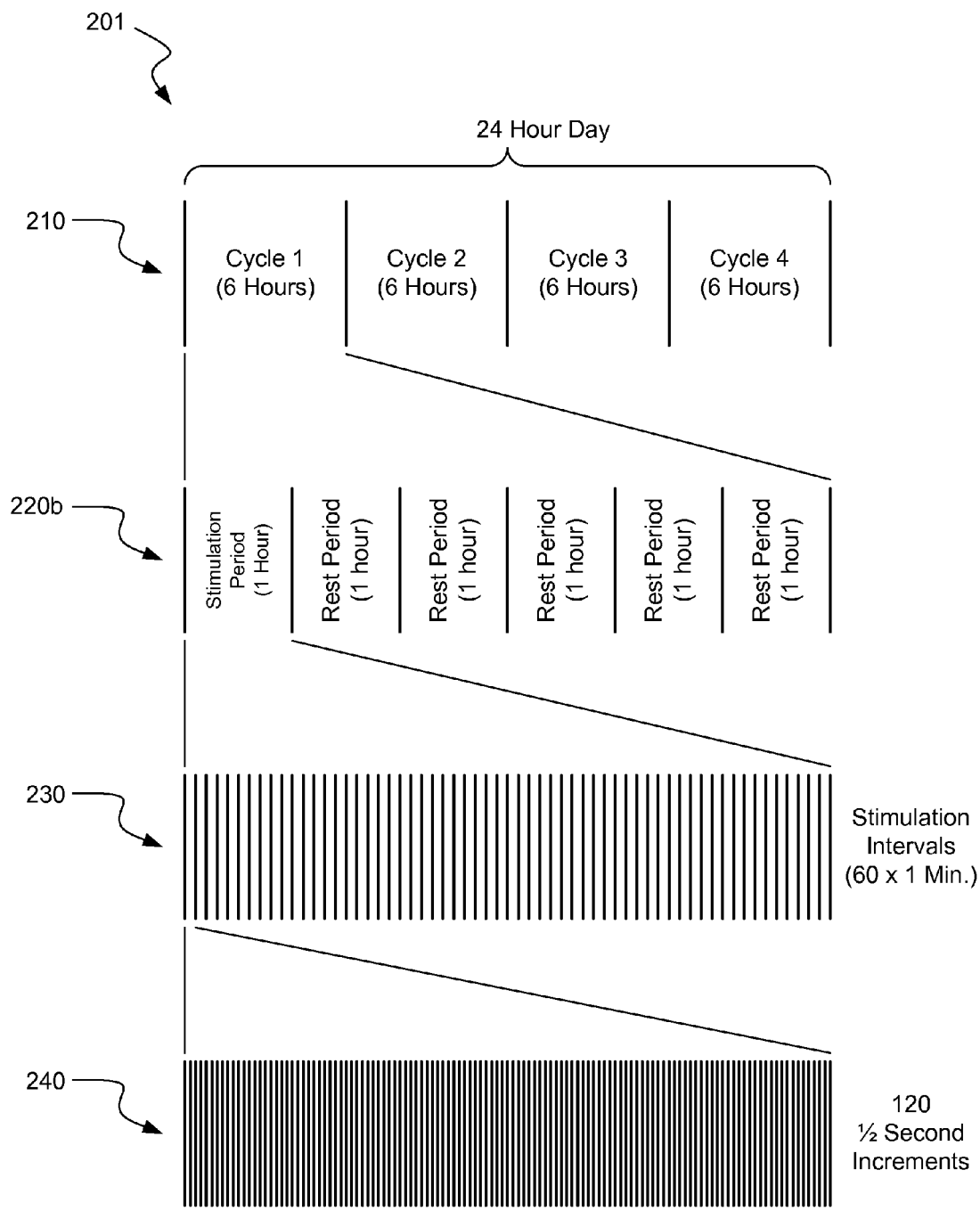
FIG. 2b is a diagram of another possible time increment breakdown by which systems and methods of the invention may stimulate an animal.

FIG. 2b shows the various timing increments 201 described above, and at which the systems of the invention may possibly be configured to operate. A day 210 may include four six hour cycles 220b. Each six hour cycle 220b may include six one-hour periods. In this example, a stimulation period 230 is shown followed by five one-hour rest periods. Other embodiments may use more stimulation periods.

Each stimulation period includes 60 one-minute stimulation intervals 240. Each one-minute stimulation interval 240 includes 120 one-half second increments. As described above, stimuli devices may be activated, deactivated, kept activated, or kept deactivated at one-half second increments. Different embodiments of the invention may therefore activate/deactivate different stimuli devices in various combinations of one-half second to produce a stimuli schedule for changing different behaviors of animals.

Figure 3:
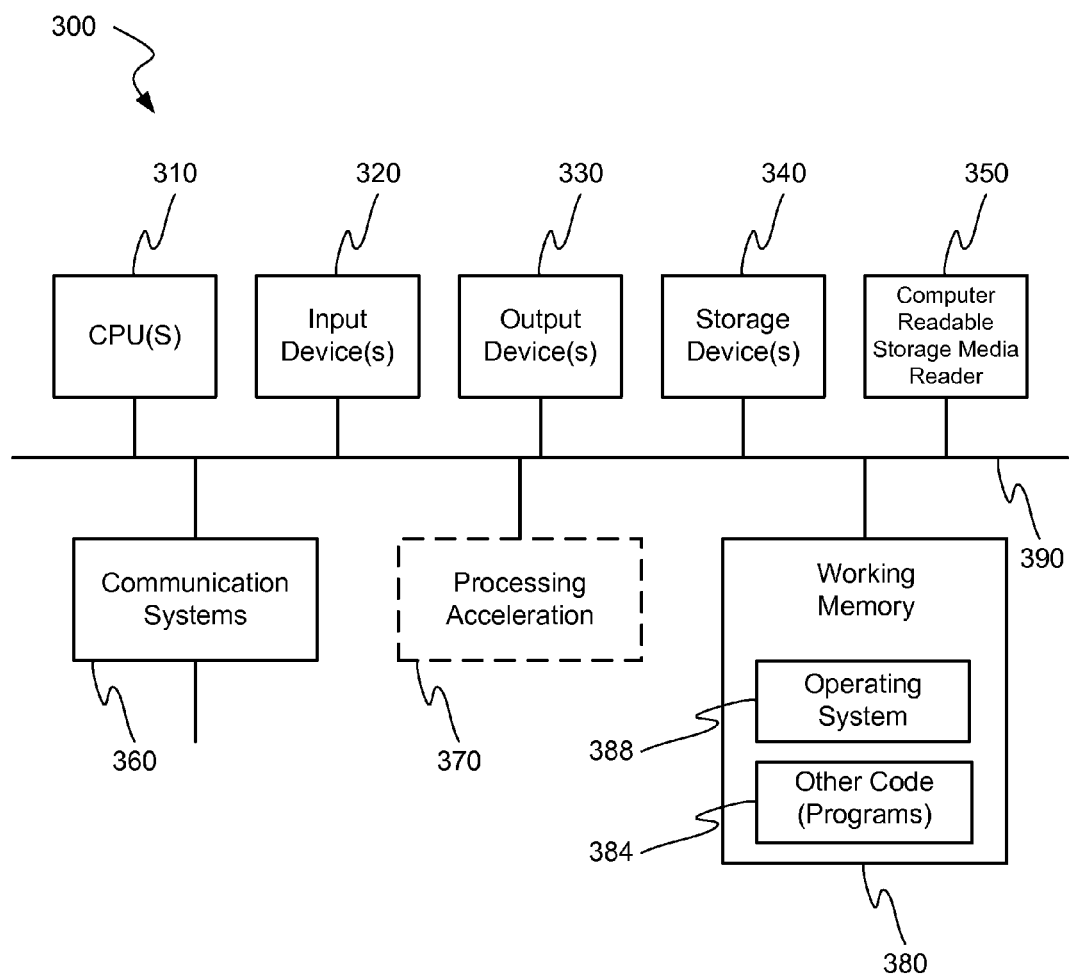
FIG. 3 is a block diagram of an exemplary computer system capable of being used in at least some portion of the apparatuses or systems of the present invention, or implementing at least some portion of the methods of the present invention.

FIG. 3 is a block diagram illustrating an exemplary computer system 300 in which embodiments of the present invention may be implemented. This example illustrates a computer system 300 such as may be used, in whole, in part, or with various modifications, to provide the functions of the primary unit, the secondary unit, the processor, the speaker, the vibration generation device, the pressure generation device, the visual indicators, the data stores, the location detection systems, and/or other components of the invention such as those discussed above. For example, various functions of the processor may be controlled by the computer system 300, including, merely by way of example, activation or deactivation of the stimuli devices, data storing, etc.

The computer system 300 is shown comprising hardware elements that may be electrically coupled via a bus 390. The hardware elements may include one or more central processing units 310, one or more input devices 320 (e.g., a mouse, a keyboard, etc.), and one or more output devices 330 (e.g., a display device, a printer, etc.). The computer system 300 may also include one or more storage device 340. By way of example, storage device(s) 340 may be disk drives, optical storage devices, solid-state storage device such as a random access memory ("RAM") and/or a read-only memory ("ROM"), which can be programmable, flash-updateable and/or the like.

The computer system 300 may additionally include a computer-readable storage media reader 350, a communications system 360 (e.g., a modem, a network card (wireless or wired), an infra-red communication device, Bluetooth™ device, cellular communication device, etc.), and working memory 380, which may include RAM and ROM devices as described above. In some embodiments, the computer system 300 may also include a processing acceleration unit 370, which can include a digital signal processor, a special-purpose processor and/or the like.

The computer-readable storage media reader 350 can further be connected to a computer-readable storage medium, together (and, optionally, in combination with storage device(s) 340) comprehensively representing remote, local, fixed, and/or removable storage devices plus storage media for temporarily and/or more permanently containing computer-readable information. The communications system 360 may permit data to be exchanged with a network, system, computer and/or other component described above.

The computer system 300 may also comprise software elements, shown as being currently located within a working memory 380, including an operating system 384 and/or other code 388. It should be appreciated that alternate embodiments of a computer system 300 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 300 may include code 388 for implementing any or all of the function of the various elements of the architecture as described herein. For example, software, stored on and/or executed by a computer system such as system 300, can provide the functions of the primary unit, the secondary unit, the processor, the speaker, the vibration generation device, the pressure generation device, the visual indicators, the data stores, the location detection systems, and/or other components of the invention such as those discussed above. Methods implementable by software on some of these components have been discussed above in more detail.

While the embodiments described herein have been discussed as related to modifying animal appetite, other possible behavioral functions may be altered by various embodiments of the invention. For example, movement patterns, resting patterns, interaction patterns (either with other animals or humans), and/or other behavioral patterns of animals may be affected by using various systems and methods of the invention.

The invention has now been described in detail for the purposes of clarity and understanding. However, it will be appreciated that certain changes and modifications may be practiced within the scope of the appended claims.

What is claimed is:

1. A method for causing cattle to consume more food, wherein the method comprises:
   coupling a primary unit to a rear portion of a spine of a cow, wherein the primary unit comprises:
      a first power source; and
      a processor;
   coupling a secondary unit to a top portion of a tail of the cow, wherein the secondary unit is coupled with the primary unit, and the secondary unit comprises:
      a pressure generation device; and
      a vibration generation device;
   causing, by the processor and via the first power source, activation, intermittently or continuously, of the pressure generation device against the top portion of the tail of the cow for at least a first increment of time;
   causing, by the processor and via the first power source, activation, intermittently or continuously, of the vibration generation device against the top portion of the tail of the cow for at least a second increment of time, wherein the first increment of time and the second increment of time are at least partially concurrent or not concurrent; and
   causing, by the processor and via the first power source, deactivation, continuously, of both the pressure generation device and the vibration device for at least a third increment of time, wherein the third increment of time is not concurrent with the first increment of time and the second increment of time.

2. The method for causing cattle to consume more food of claim 1, wherein:
   the secondary unit further comprises a speaker generating a sound within an audible range of the cow; and
   the method further comprises causing, by the processor and via the first power source, activation, intermittently or continuously, of the speaker to generate a sound within the audible range the cow for at least a fourth increment of time, wherein:
      the fourth increment of time, the first increment of time, and the second increment of time are at least partially concurrent or not concurrent; and
      the fourth increment of time is not concurrent with the third increment of time.

3. The method for causing cattle to consume more food of claim 2, wherein the method further comprises:
   causing, by the processor and via the first power source, deactivation, continuously, of the speaker for at least the third increment of time.

4. The method for causing cattle to consume more food of claim 3, wherein activation of the pressure generation device, the vibration generation device, or the speaker comprises:
selectively, in one-half second increments, activating, keeping activated, deactivating, and/or keeping deactivated, at least one of the pressure generation device, the vibration generation device, or the speaker.

5. The method for causing cattle to consume more food of claim 4, wherein activation of the pressure generation device, the vibration generation device, or the speaker comprises:
initiating a stimulus interval of 120 one-half second increments of selected activation, continued activation, deactivation, and/or continued deactivation of at least one of the pressure generation device, the vibration generation device, or the speaker.

6. The method for causing cattle to consume more food of claim 5, wherein activation of the pressure generation device, the vibration generation device, or the speaker comprises:
initiating a stimulus period of 60 one-minute consecutive stimulus intervals.

7. The method for causing cattle to consume more food of claim 6, wherein activation of and deactivation of the pressure generation device, the vibration generation device, or the speaker comprises:
initiating a cycle which includes the stimulus period and a rest period of seven hours following the stimulus period, wherein the rest period comprises deactivation and continued deactivation of the pressure generation device, the vibration generation device, and the speaker.

8. The method for causing cattle to consume more food of claim 7, wherein activation of and deactivation of the pressure generation device, the vibration generation device, or the speaker comprises:
initiating three consecutive cycles in a 24 hour day.

9. The method for causing cattle to consume more food of claim 7, wherein activation of and deactivation of the pressure generation device, the vibration generation device, or the speaker comprises:
initiating four consecutive cycles in a 24 hour day.

10. The method for causing cattle to consume more food of claim 6, wherein the method further comprises:
causing, by the processor, data to be stored related to time elapsed; and
causing, by the processor, data to be stored related to number of stimulus intervals or stimulus periods delivered.

11. The method for causing cattle to consume more food of claim 6, wherein activation of and deactivation of the pressure generation device, the vibration generation device, or the speaker comprises:
initiating a cycle which includes the stimulus period and a rest period of five hours following the stimulus period, wherein the rest period comprises deactivation and continued deactivation of the pressure generation device, the vibration generation device, and the speaker.

12. The method for causing cattle to consume more food of claim 2, wherein the method further comprises:
causing, by the processor and via the first power source, a visual indicator to display when at least one of the pressure generation device, the vibration generation device, or the speaker is active.

13. The method for causing cattle to consume more food of claim 2, wherein the method further comprises:
causing, by the processor, a visual indicator to display when a voltage of the first power source drops below a predefined level.

14. The method for causing cattle to consume more food of claim 13 wherein the method further comprises:
causing, by the processor, the visual indicator to display when a voltage of a second power source drops below a predefined level, wherein the second power source provides power to at least one of the pressure generation device, the vibration generation device, or the speaker.

15. The method for causing cattle to consume more food of claim 2, wherein activating the speaker comprises:
causing, by the processor via the first power source, the speaker to emit a sound at about 2500 hertz and 85 decibels.

16. The method for causing cattle to consume more food of claim 1, wherein activation of the pressure generation device or the vibration generation device comprises activating a sound generation device.

17. The method for causing cattle to consume more food of claim 1, wherein activation of the pressure generation device and the vibration generation device comprises activating the same device.

18. The method for causing cattle to consume more food of claim 1, wherein the method further comprises:
causing, by the processor, data to be stored related to a location of the animal over time.

19. A method for causing cattle to consume more food, wherein the method comprises:
coupling a primary unit to a rear portion of a spine of a cow, wherein the primary unit comprises a processor;
coupling a secondary unit to the a top portion of a tail of the cow, wherein the secondary unit is coupled with the primary unit, and the secondary unit comprises:
a pressure generation device; and
a vibration generation device;
causing, by the processor, activation, intermittently or continuously, of the pressure generation device against the top portion of the tail of the cow for at least a first increment of time;
causing, by the processor, activation, intermittently or continuously, of the vibration generation device against the top portion of the tail of the cow for at least a second increment of time, wherein the first increment of time and the second increment of time are at least partially concurrent or not concurrent; and
causing, by the processor, deactivation, continuously, of both the pressure generation device and the vibration device for at least a third increment of time, wherein the third increment of time is not concurrent with the first increment of time and the second increment of time.

20. A method for causing cattle to consume more food, wherein the method comprises:
coupling a stimulation unit to the a top portion of a tail of a cow, wherein the stimulation unit comprises:
a pressure generation device; and
a vibration generation device;
causing activation, intermittently or continuously, of the pressure generation device against the top portion of the tail of the cow for at least a first increment of time;
causing activation, intermittently or continuously, of the vibration generation device against the top portion of the tail of the cow for at least a second increment of time, wherein the first increment of time and the second increment of time are at least partially concurrent or not concurrent; and causing deactivation, continuously, of both the pressure generation device and the vibration device for at least a third increment of time, wherein the third increment of time is not concurrent with the first increment of time and the second increment of time.

\* \* \* \* \*